United States Patent [11] 3,532,165

| [72] | Inventors | Philip J. Raifsnider;<br>Dorothy E. Raifsnider, Executrix,<br>Denver, Colorado |
|---|---|---|
| [21] | Appl. No. | 760,737 |
| [22] | Filed | Sept. 18, 1968 |
| [45] | Patented | Oct. 6, 1970 |
| [73] | Assignee | Shell Oil Company<br>New York, New York<br>a corporation of Delaware |

[54] IN-SITU FORMED $CO_2$ DRIVE FOR OIL RECOVERY
3 Claims, No Drawings

[52] U.S. Cl. .................................................. 166/270, 166/274
[51] Int. Cl. ................................................ E21b 43/22
[50] Field of Search ........................................ 166/268, 270, 271, 300, 273, 274, 275

[56] References Cited
UNITED STATES PATENTS

| 2,001,350 | 5/1935 | Mills................... | 166/300 |
| 3,072,185 | 1/1963 | Bond et al............ | 166/274UX |
| 3,091,292 | 5/1963 | Kerr..................... | 166/271 |
| 3,259,187 | 7/1966 | Prats et al............ | 166/270 |
| 3,344,858 | 10/1967 | Gilchrist et al....... | 166/270 |
| 3,353,597 | 11/1967 | Mulder................. | 166/271X |
| 3,392,782 | 7/1968 | Ferrell et al.......... | 166/270X |

*Primary Examiner*—Marvin A. Champion
*Assistant Examiner*—Ian A. Calvert
*Attorneys*—George G, Pritzker and J. H. McCarthy ABSTRACT: A method of recovering hydrocarbons from underground formations comprising treating the formation with a slug of fluid capable of forming in-situ $CO_2$ followed by an injection of a drive fluid to aid in recovering the hydrocarbons. The $CO_2$ forming slug may constitute an acid or sulfur dioxide and a salt, or two salts.

IN-SITU FORMED CO₂ DRIVE FOR OIL RECOVERY

BACKGROUND OF THE INVENTION

This invention relates to displacement of oil from underground oil-containing reservoirs and more particularly to pretreating such formations with a slug of fluid containing reactants capable of forming in-situ carbon dioxide ($CO_2$) and thereafter using a drive fluid if desirable, e.g., a waterflood technique, to displace and recover oil from said reservoirs.

It is well known in the art that oil-bearing formations treated with carbon dioxide ($CO_2$) in gaseous or liquefied form or as components in aqueous or hydrocarbon fluids produce beneficial effects on formations thus treated with resultant increases in oil production. The benefits of treating oil-bearing formations with slugs of $CO_2$ in the forms mentioned are fully described in the art as evidenced by reference to U.S. Pat. Nos. 2,623,597; 2,875,830—3; 3,344,857; and 3,368,627 and the Journal of Petroleum Technology, articles of March, 1963, pages 237–42 and November 1963, pages 247–52. However, the use of $CO_2$ in oil recovery presents many problems which at times limits its use because of corrosion, difficulties in handling, the high cost of liquefying the $CO_2$ gas and maintaining it in that form in the formation, the requirement of special equipment both above and below ground in order to mix, blend and maintain the $CO_2$ in the carrier fluid such as aqueous or hydrocarbon solutions as well as many other problems such as preventing the $CO_2$ from fingering through the formation thereby losing its beneficial problems such as properly wetting the formation, imparting fluidity to the crude oil being recovered and acting as a bridging slug between the crude oil and the waterflood so as to prevent fingering and breakthrough of the waterflood drive used to recover the crude.

It is an object of the present invention to utilize an improved process for recovering hydrocarbons from underground formations.

Still another object of this invention is to improve oil recovery from underground formations by pretreating the formations prior to use of a drive fluid with a fluid capable of forming in-situ carbon dioxide ($CO_2$).

Still another object of this invention is to recover oil from underground formations by treating the formations with an aqueous solution capable of forming $CO_2$ which effects the reduction of viscosity and increases the fluidity of the crude oil and is susceptible to recovery by subsequent immiscible and/or miscible drives such as waterflooding or hydrocarbon drive.

Other objects of the invention will be apparent from the following description of the invention.

SUMMARY OF THE INVENTION

It has now been discovered that the above and other objects of the present invention can be obtained by treating an underground oil-bearing formation from which hydrocarbons such as oil, gas, etc., are to be recovered prior to use of a drive fluid, if necessary, with a solution capable of forming in-situ $CO_2$ which solution functions as an oil recovery stimulating solution as well as a barrier slug for preventing fingering and breakthrough of the drive fluid subsequently used to force the hydrocarbons, e.g., crude oil, to a production well from which the oil is recovered. Also, the formations thus treated with the in-situ $CO_2$ generating solutions generally via an injection well wherein said solutions are also capable of modifying the conditions of the formation so as to facilitate the recovery of oil from the formation by natural means or by aid of a drive fluid such as water and/or steam, emulsions, miscible drives such as hydrocarbons via an injection well or via a production well.

An effective method of forming in-situ $CO_2$ solutions in the oil-bearing formation to facilitate and increase in oil recovery comprises injecting into the formation a concentrated solution of an inorganic acid such as hydrochloric acid or sulfuric acid, followed by injection of a stoichiometric excess of saturated solution containing an inorganic salt such as sodium carbonate, which solution in the formation generates carbon dioxide. Thus, a method of generating in-situ $CO_2$ in an oil-bearing formation is to inject into an oil sand formation concentrated sulfuric acid (100—105 percent), followed by injection of a stoichiometric excess of saturated sodium carbonate solution. The reaction of the two solutions results in in-situ generation of $CO_2$ which facilitates oil recovery. Also, the reaction results in release of considerable thermal energy which heats the crude in the formation and favorably effects the viscosity and fluidity of the crude for improved oil recovery. Instead of using sulfuric acid, sulfur dioxide can be used in combination with sodium carbonate to effect release in-situ of carbon dioxide.

Still other methods of releasing in-situ $CO_2$ in the oil-bearing formations is to inject therein aqueous solutions of preferably hot sodium carbonate or bicarbonate and sodium sulfite or bisulfite:

(1) $Na_2CO_3 + 2\ NaHSO_3 \rightarrow 2\ Na_2SO_3 + H_2O + CO_2$
(2) $NaHCO_3 + NaHSO_3 \rightarrow Na_2SO_3 + H_2O + CO_2$

PREFERRED EMBODIMENT OF THE INVENTION

As an illustrative example, into an oil-bearing formation via an injection well was injected an aqueous solution of 10,000 pounds of concentrated sulfuric acid and 10,600 pounds of sodium carbonate and the reaction formed 4500 pounds of carbon dioxide in-situ and 5 million B.t.u.'s of energy which help heat the oil in the formation and decrease its viscosity. This chemical injection was followed by a conventional waterflood to effectively recover oil from the formation.

Once the in-situ $CO_2$ containing slug has been established, the formation can be subjected to treatment, if necessary, with a fluid drive. Such drives include waterflooding, steam flooding, miscible flooding and combinations thereof such as water-steam. The fluid drives can contain surfactants which can be anionic, cationic and/or non-ionic such as described in U.S. Pat. Nos. 3,330,344; 3,348,611; 3,366,174 or the like; thickeners, viscosity increasers, pushers and the like, e.g., polyacrylamides and derivatives, polyalkylene oxide polymers, polyvinyl-alcohol sulfonate and the like some of which are described in U.S. Pat. Nos. 3,341,319; 3,332,904; 3,254,719; 3,367,418; 3,368,620 and 3,370,649.

It is understood that various changes in the details described to explain the invention can be made by persons skilled in the art within the scope of the invention as expressed in the appended claims.

I claim:

1. A method of recovering oil from an underground oil-bearing formation comprising the steps of:
   1. injecting into the oil-bearing formation an aqueous solution of a mixture
      a. a first salt selected from the group consisting of sodium carbonate and sodium biacarbonate; and
      b. a second salt selected from the group consisting of sodium sulfite and sodium bisulfite;
   2. maintaining solution of step 1. in the formation until evolution of in-situ $CO_2$ formed by the interaction of the chemicals a. and b. in step 1. ceases;
   3. injecting a drive fluid; and,
   4. recovering oil from the formation.

2. The method of claim 1 wherein the inorganic salts forming $CO_2$ are sodium carbonate and sodium bisulfite.

3. The method of claim 1 wherein the inorganic salts forming $CO_2$ are sodium bicarbonate and sodium bisulfite.